United States Patent
Berman et al.

[45] Apr. 25, 1972

[11] 3,658,528

[54] PHOTOCHEMICAL FIGURING OF OPTICAL ELEMENTS

[72] Inventors: Elliot Berman, Quincy; Gerald L. McLeod, Lexington; Charles H. C. Pian, Burlington; Samuel H. Stein, Lexington; Juliette F. Pian, Burlington, all of Mass.

[73] Assignee: Itek Corporation, Lexington, Mass.

[22] Filed: Sept. 22, 1969

[21] Appl. No.: 859,913

[52] U.S. Cl. .......................... 96/35.1, 96/38.3, 204/159.14, 204/159.2
[51] Int. Cl. ........................................ G03c 5/00, G03c 11/00
[58] Field of Search .............................. 96/35.1, 38.3, 35, 27; 204/159.14, 159.22

[56] References Cited

UNITED STATES PATENTS

| | | | |
|---|---|---|---|
| 2,399,799 | 5/1946 | Guellich | 96/38.3 |
| 2,756,143 | 7/1956 | Murray | 96/33 X |
| 2,670,286 | 2/1954 | Minsk et al. | 96/35.1 |
| 2,892,712 | 6/1959 | Plambeck | 96/35.1 |
| 2,927,022 | 3/1960 | Martin et al. | 96/35.1 |
| 3,137,633 | 6/1964 | Kline | 204/159.14 X |
| 3,143,417 | 8/1964 | Reichel et al. | 204/159.14 X |
| 3,146,106 | 8/1964 | Hamlin | 96/35.1 |
| 3,427,161 | 2/1969 | Lamdon et al. | 96/35.1 |

Primary Examiner—John T. Goolkasian
Assistant Examiner—Joseph C. Gil
Attorney—Homer O. Blair and Robert L. Nathans

[57] ABSTRACT

A method and means for correcting irregularities and properly contouring optical components by coating the surface to be contoured with a layer of photopolymerizable or photodepolymerizable material and using light to selectively operate on the layer to achieve the proper contour. In the case when a polymerized coating is used, the layer is deposited on the optical surface and light or similar radiant energy is selectively directed onto the outer surface of the polymer, to photodepolymerize the outer portions in accordance with the desired figuring. The resulting depolymerization products are then removed by dissolving with a suitable solvent or are distilled away in vacuo, leaving a polymerized coating in the contour desired. In the alternate case, a layer of polymerizable material is deposited on the surface to be figured and a selective pattern of light or similar radiation is directed through the optical component, causing polymerization at the component-layer interface. The unaffected components of the layer are dissolved away with a suitable solvent, leaving the required polymerized surface on the component. The selective radiation is produced in response to digitally encoded signals obtained from a comparison of the desired contour with a contour map of the actual surface of the optical component.

9 Claims, 5 Drawing Figures

Patented April 25, 1972                                         3,658,528

PHOTOCHEMICAL FIGURING OF OPTICAL ELEMENTS

BACKGROUND OF THE INVENTION

The present invention relates to the field of optical polishing and more particularly to a method and means of optical contouring using photopolymerization or photodepolymerization.

The most difficult and time-consuming part of preparing an optical component is the final figuring of the component's surface from approximately two wave lengths uniformity to one-quarter wave length or better uniformity. This final figuring or contouring of optical elements has in the past been generally accomplished by manually polishing the optical surface, using precise combinations of polishing powder and mechanical pressure to achieve the desired smoothing of the contour. This process requires a great deal of time and skill on the part of an experienced optician. As a result, optical polishing is a time-consuming and expensive operation. In addition, if a slight error is made in the polishing, the optical element must be replaced so that optical manufacturing can become a very costly operation. It is therefore quite desirable to develop an automated method and means to replace manual polishing while achieving an equivalent level of precision.

The method and means of the present invention provides such an automated process, which considerably reduces the time and expense presently required for optical polishing and obviates the need for replacing optical components when errors are made in the figuring process.

SUMMARY OF THE INVENTION

The method and means of the present invention accomplish automated optical polishing by photochemically controlling the thickness of a layer of photosensitive material which is deposited on the optical surface to be contoured. A portion of the layer is selectively irradiated with a characteristic radiation which chemically alters the irradiated material. The chemically-altered and the unaltered portions are then separated by removing one and leaving the other on the surface. There are two alternate ways of interacting the radiation with the photosensitive material on the surface of the component to achieve the desired contour. Firstly, a layer of polymerized material may be placed on the optical surface and then depolymerized by light directed onto the outer surface of the layer. The light is directed selectively in the areas which are to be subsequently removed. The material which has been depolymerized in these areas is then dissolved away with a suitable solvent or distilled away in vacuo, leaving the required surface on the component. Alternatively, a layer of polymerizable material placed on the optical surface may be irradiated through the component, cross-linking the polymer at the component-polymer interface. In this case, the light is shone in areas that are to be retained. The unpolymerized material remaining on the outside of the layer is then dissolved away with a suitable solvent, leaving the required surface on the component. Thus, any desired surface configuration may be achieved to the desired precision by selectively controlling the energy of the light which is directed onto the photosensitive coating. The light energy is controlled by digitally encoded signals which are derived from a comparison of the desired contour with a map of the actual contour of the optical component, which map may be obtained from interferometric techniques. See U.S. Pat. Application No. 719,657, filed Apr. 8, 1968, and assigned to the same assignee as the present invention.

DETAILED DESCRIPTION OF THE DISCLOSURE

Figure 1:
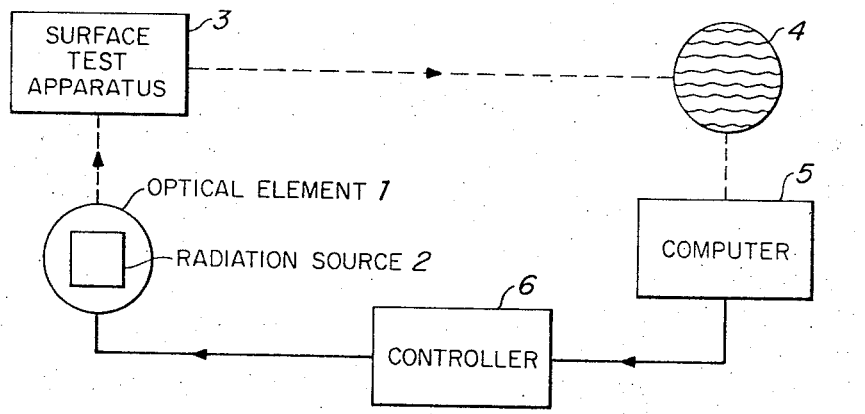
FIG. 1 is a diagrammatic representation of a system which may be used to practice the present invention.

FIG. 1 shows an automated system capable of performing the present invention. The operation of this system will first be described before a detailed discussion of the actual polishing process is presented.

An appropriately coated optical blank 1, which is about to undergo the automatic figuring process of the present invention, is shown positioned beneath a lamp 2 or other means for emitting suitable light or electromagnetic radiation to be used in the process. Before the photopolymerization and photodepolymerization process can begin, however, an indication of the actual contour of the blank 1 must be obtained which can be compared with the desired contour, so that areas on the surface of the blank which require correction may be determined. Accordingly, a surface test apparatus 3 is provided for measuring the surface. While the desired measurement of the surface can be performed by a mechanical apparatus, such as by dial indicators or a transversing probe, the preferred method comprises the use of an interferometer. An interference picture 4 of the surface is obtained which indicates the surface asymmetries and irregularities on the blank 1. This interference picture 4 is then digitally encoded in a suitable computer 5 containing information as to the desired contour of the optical component 1. The computer 5 accordingly provides information as to the differences between the existing and the desired relative elevations occuring over various areas of the blank's surface. This error information is fed to a suitable controller apparatus 6. The controller apparatus 6 converts the digital information into appropriate signals which control the operation of the means 2 for irradiating the coated optical component 1. The details of the foregoing are not necessary to the understanding of the present invention. See the following application assigned to the same assignee as the present invention for further details: Ser. No. 719,657, filed Apr. 8, 1968, entitled Optical Surface Generating Method and Apparatus.

The irradiating means 2 may be in the form of a lamp or a bank of lamps or a flying spot capable of emitting light or other electromagnetic radiation in a particular spectral range. The signals from the controller 6 selectively operate the irradiating means 2 to accomplish the desired degree of photopolymerization or photodepolymerization, as will now be more fully explained.

Figure 2:
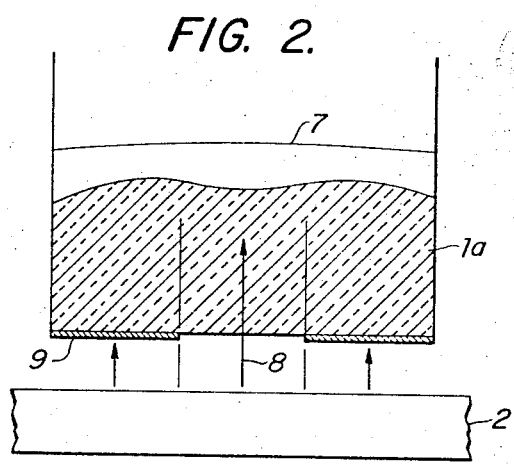
FIGS. 2 and 3 are cross-sectional views of a portion of a coated optical component before and after photopolymerization.
Figure 3:
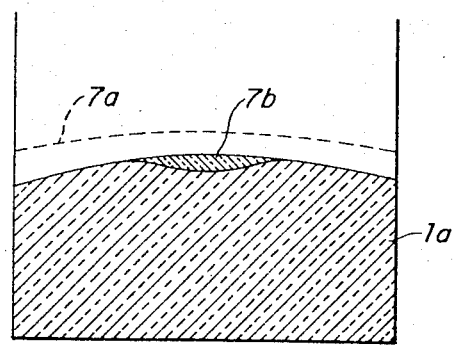

Firstly, with regard to the photopolymerization process, FIG. 2 shows a portion of the surface of an optical component 1a which has been coated with a thin layer of polymerizable material 7. After the surface has been coated, light 8 in a suitable spectral range or, more particularly, radiant energy of a proper wave length is selectively directed through the optical component 1a and causes polymerization at the layer-component interface. The portions of the layer 7 which are irradiated by the light become polymerized. When the proper amount of polymerization is achieved, the unaffected residue 7a may be removed by washing with a suitable solvent leaving the polymerized portion 7b on the surface, forming the desired contour as shown in FIG. 3.

Selective irradiation of the component's surface may be accomplished in a number of ways. For example, a fine beam of light, whose wave length and intensity produce sufficient energy to chemically alter the polymer coating may be directed onto particular areas of the component's surface which require correction. The light beam may be controlled in the manner of a flying spot scanner (e.g. D'Arsonval Galvanometer Movement) so as to sweep the surface at a given rate. The beam may be intensity modulated by the controller apparatus 6 so that the sweep pattern would cause the areas requiring greater correction to be more intensely irradiated than those areas requiring less correction.

In the alternative the beam sweep velocity may be modulated to alter the amount of radiation applied to given incremental areas of the element.

Another alternate method using a single lamp may comprise the utilization of suitable masking on the undersurface of the component as shown in FIG. 2. A mask 9 may be developed from a comparison of the interference picture 4 of the surface contour and a desired contour, such that when placed on the undersurface of the component, it will control the amount of light that reaches the various areas of the polymer coating. The use of such masking would of course obviate the need for the electronic computing apparatus 5 and 6.

A further irradiation arrangement comprising the use of a bank or matrix of individually controlled lamps would also be suitable. In this arrangement, signals from the controller apparatus 6 activate the individual lamps in appropriate patterns. The lamps would be selectively energized in accordance with the location and time of exposure required to produce the desired amount of cross-linking in selected areas to correct the errors on the surface of the component.

Figure 4:
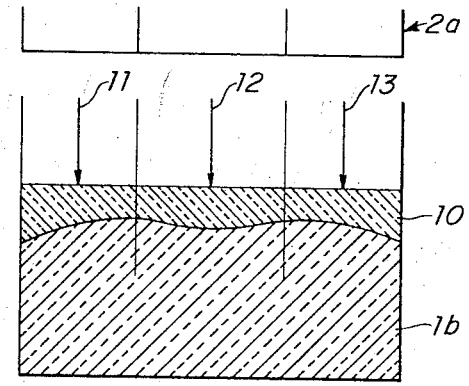
FIGS. 4 and 5 are cross-sectional views of a portion of a coated optical component before and after photodepolymerization.
Figure 5:
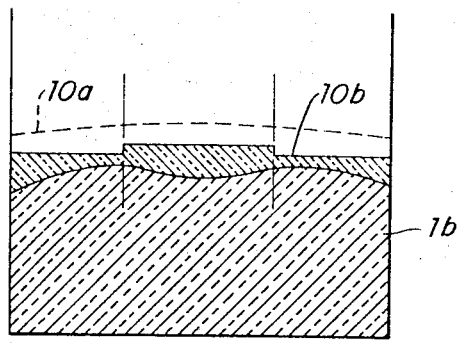

The photodepolymerization process is illustrated in FIGS. 4 and 5. FIG. 4 shows a portion of the surface of an optical component 1b with a thin coating of a suitable polymer 10 which is appropriately photodegradable. As in the photopolymerization process, radiant energy of proper wave length is directed onto the coated component 1b, but in this instance, the radiation strikes the polymer 10 at the air-polymer interface and radiation of three different wave lengths 11, 12 and 13 from a bank of lamps 2a is illustrated. The outer layers of the polymer are depolymerized by the radiation in proportion to the energy falling thereon leaving an outer coating 10a of depolymerization products. When the desired polymer configuration is achieved, irradiation is stopped and the outer coating 10a is removed by suitable solvent washing, thus leaving the remaining polymer 10b in the desired contour on the optical component surface as shown in FIG. 5.

The photosensitive materials must be susceptible to chemical alteration which will enable separation of the original material from the altered material. Such separation can be simply based on differential solvent solubility, or alternatively on the basis of volatility of one of the forms of the material. The preferred materials are those which enable simple solvent separation of the altered and original material since the use of complicated vacuum equipment is avoided.

The separation of the said materials should lead to removal of one with the other remaining on the surface of the component to obtain the desired result. The material which remains on the component surface should be substantially permanent, i.e. relatively stable and adherent to the component surface, especially in extremely thin thickness, and should preferably have high optical quality.

The photosensitive material for use in the present invention can be one of two general classes. The first class embraces those substances which under the influence of light degrade, i.e. are photodegraded, while the second class include those materials which under the influence of light, undergo condensation, addition or cross-linking type reactions.

The first class of materials is exemplified by polymers which under the influence of light depolymerize, e.g. to form a monomer, or at least lower molecular weight polymers. Preferred substances in this class are polymers which degrade to ethylenic monomers, especially those having a terminal ethylenic double bond and which are described in detail in U.S. Pat. No. 2,892,712, incorporated herein by reference. Of this type are polymers and copolymers of alkyl methacrylates, alkyl styrenes, formaldehyde and tetrahydrofuran as described in the said patent.

The second class of materials is exemplified by substances which under the influence of light undergo condensation, addition or cross-linking reactions. Such materials include monomeric as well as polymeric substances which react themselves or with other substances by condensation or addition to form macromolecular products. Thus such materials react, for example, by polymerization in the case of monomers and addition or cross-linking in the case of polymer starting materials.

Substances exemplary of the second class are well known to the art and are described for example, in U.S. Pat. Nos. 2,610,120 and 2,670,287 (polyvinyl cinnamate with light sensitizers such as nitro compounds and diaminoaryl compounds); 2,756,143 (benzal and cinnamal-arvinylacetophenone polymers); 2,861,058 (alkali soluble succinic acid or phthalic esters of partially esterified polyvinyl alcohol in which the esterifying acid is cinnamic acid, and derivatives thereof); 2,702,243 (Diazo compounds and polyamides); 3,143,416 and 3,143,417 (Diazo compounds and specified polyamides, e.g. N-alkoxy-methylated caparolactam polymer); 3,189,451 (aldehydes and a diazo compound of an aryl amine); and 2,927,022 (cellulose derivatives and an ethylenic compound as an addition polymerization compound). All of these patents are incorporated herein by reference for disclosure of the said substances.

When substances of the first class are employed in the present process, irradiation leads to production of the monomer or low molecular weight polymer which is removed. Thus the irradiation is effected at the interface of the polymer layer and the atmosphere above the layer. In this case, the irradiation product is the monomer which is removed and the unaffected polymer remains.

When substances of the second class are used in the present process, irradiation leads to production of a polymer or crosslinked or addition product and the irradiation is effected through the component so that reaction occurs at the interface of the component and the layer of material. In this case, the irradiation product is the polymer and the unaffected materials are removed.

The removal of the solvent-soluble materials is readily accomplished by the mere expediency of solvent washing, usually repeated several times. The selection of appropriate solvents for this purpose is readily accomplished by reference to standard texts on solubilities of organic compounds. The aforementioned U.S. Patents provided detailed information on appropriate solvents for the systems described.

Before the component is coated with the photosensitive material, it is desirable to ensure thorough cleanliness of the surface thereof. For example, the surface is carefully cleaned with a solvent such as methylene chloride or methyl ethyl ketone, then with a water miscible glass cleaner, and finally rinsed with high purity acetone.

In coating, the layer of photosensitive material is applied by any of several methods, e.g. spraying, and brushing, but preferably by use of a spinner, particularly for automated polishing techniques. The photosensitive material in solution is carefully filtered and then applied to the cleaned surface of the component on a previously cleaned spinner. The component is covered by a plate glass spinner cover and the spinner is turned on while an overhead infrared drying lamp supplies heat and a Millipore filtered air supply provides scavenging action. A syringe is filled with the solution of photosensitive material and fitted with an appropriate filter in an adapter. To accomplish coating, the spinner and drying air are turned off and the material from the syringe is expelled onto the component through the adapter fitted through a hole in the cover plate. The hole is then covered and the spinner turned on after which the heat and drying air is initiated as indicated. Within about 30 minutes, most coatings are dry to the touch and can be removed after which they are placed in a dessicator or storage cabinet.

By varying the viscosity of the added solutions, layers of varying thickness can be obtained. The surface figure of the layer can be determined by use of a 1/20 wave length master flat. If the surface of the layer is flat, straight parallel fringes are seen, with the spacing between fringes indicating the slope of the air wedge between the surface of the coating and the lower surface of the master flat.

The thus coated component is subjected to selective irradiation as hereinbefore described using, for example, a Hanovia 400 watt, 612-C lamp in a suitable lamphouse with quartz lenses, with a 3 percent liquid cupric chloride filter or an Aristo grid lamp, type B10 to offset the heat generated.

After treatment, the component can be further treated as desired. For example, an aluminum mirror is vacuum deposited with glow discharging the surface to obtain an excellent mirror. The adhesion of the mirror to the polymer surface portions is clearly superior as opposed to the adhesion to the glass portions.

EXAMPLE I

A layer of poly (methylmethacrylate) on a component is exposed to ultraviolet radiation at 130° C. through a mask prepared on the basis of the contour of the component. The exposure is carried out under high vacuum ($10^{-6}$ mm. Hg.).

This coating is subsequently aluminized after normal glow discharge treatment and the Scotch tape test of the resulting mirror shows excellent adherence of the aluminum to the polymer layer.

EXAMPLE II

A layer of polyvinylbenzalacetophenone on a component is selectively exposed through the component to ultraviolet radiation using the apparatus of FIG. 1 of the drawings after which the unaffected coating is removed by solvent washing.

The component is then aluminized as in Example I.

It has been found that the above-described processes may be used for the final figuring of optical component surfaces to accomplish one-quarter wave length uniformity or better. In addition, polymer coatings achieved by both methods will satisfactorily accept an aluminized coating as required on certain reflective components.

A method and means are thus presented for automatically polishing or contouring optical lenses and components which will accomplish the desired surface uniformity with less time and expense than were required for the previously used manual polishing techniques.

What is claimed is:

1. In the preparation of an optical element including the step of performing optical figuring on a surface of said element to conform it to a predetermined surface contour, the improvement wherein optical figuring is performed by the process comprising:
   a. determining the differences between the existing surface contour of said optical element and the desired surface contour using mechanical or optical means;
   b. coating the existing surface of the optical element with a layer of a photopolymerizable or photodepolymerizable material;
   c. selectively irradiating portions of the layer with activating radiation to chemically polymerize said polymerizable material or depolymerize said depolymerizable material in irradiated areas, said radiation pattern being characteristic of the differences determined in step a; and,
   d. removing undesired portions of said selectively irradiated layer to thereby achieve the desired optical figuring.

2. An improvement of claim 1 wherein the layer comprises a photopolymerizable material.

3. An improvement of claim 2 wherein said photopolymerizable material comprises a cross-linkable polymer.

4. An improvement of claim 3 wherein removal of undesired portions of said layer is effected by solvent treatment.

5. An improvement of claim 4 wherein said polymer comprises a derivative of polyvinylbenzalacetophenone.

6. An improvement of claim 4 wherein the selective irradiating is accomplished by masking the element.

7. An improvement of claim 1 wherein said layer comprises a polymer which becomes depolymerized in the irradiated portions and the depolymerized portions are subsequently removed.

8. An improvement of claim 7 wherein said depolymerizable polymer comprises polymethylmethacrylate.

9. An improvement of claim 8 wherein the selective irradiating is accomplished by masking the element.

* * * * *